(12) United States Patent
Bender et al.

(10) Patent No.: US 8,018,844 B2
(45) Date of Patent: Sep. 13, 2011

(54) RELIABLE MESSAGE TRANSFER OVER AN UNRELIABLE NETWORK

(75) Inventors: Carl A. Bender, Highland, NY (US); Aruna V. Ramanan, Poughkeepsie, NY (US); Nicholas P. Rash, Poughkeepsie, NY (US); Karen F. Rash, legal representative, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

(21) Appl. No.: 11/210,980

(22) Filed: Aug. 24, 2005

(65) Prior Publication Data

US 2007/0047453 A1 Mar. 1, 2007

(51) Int. Cl.
*H04J 1/16* (2006.01)

(52) U.S. Cl. ........ 370/227; 370/216; 370/230; 370/225; 370/228

(58) Field of Classification Search .................. 370/242, 370/359, 252, 395.1, 237, 248, 251, 230, 370/216, 389, 225, 227, 228
See application file for complete search history.

(56) References Cited

U.S. PATENT DOCUMENTS

| | | | | | |
|---|---|---|---|---|---|
| 4,532,625 | A | * | 7/1985 | Stover | 370/225 |
| 5,068,892 | A | * | 11/1991 | Livanos | 379/112.01 |
| 5,297,137 | A | * | 3/1994 | Ofek et al. | 370/403 |
| 5,651,027 | A | * | 7/1997 | Okuyama | 375/260 |
| 5,654,695 | A | * | 8/1997 | Olnowich et al. | 340/825.01 |
| 5,764,624 | A | | 6/1998 | Endo et al. | 370/218 |
| 5,781,546 | A | * | 7/1998 | Sethu | 370/389 |
| 5,812,549 | A | * | 9/1998 | Sethu | 370/389 |
| 5,892,923 | A | * | 4/1999 | Yasuda et al. | 709/239 |
| 5,987,521 | A | * | 11/1999 | Arrowood et al. | 709/239 |
| 6,031,835 | A | * | 2/2000 | Abali et al. | 370/388 |
| 6,148,411 | A | * | 11/2000 | Ichinohe et al. | 714/4 |
| 6,411,599 | B1 | | 6/2002 | Blanc et al. | 370/219 |
| 6,496,476 | B1 | | 12/2002 | Badt, Jr. et al. | 370/228 |
| 6,535,990 | B1 | * | 3/2003 | Iterum et al. | 714/4 |

(Continued)

FOREIGN PATENT DOCUMENTS

EP 282628 A 9/1988

(Continued)

*Primary Examiner* — Ricky Ngo
*Assistant Examiner* — Dewanda Samuel
(74) *Attorney, Agent, or Firm* — Steven Chiu, Esq.; Blanche E. Schiller, Esq.; Heslin Rothenberg Farley & Mesiti P.C.

(57) ABSTRACT

In a communications network having a plurality of nodes adapted to communicate with each other, and more than one path available between most source-destination node-pairs, a network interface is associated with each node. Each network interface has a plurality of route tables for defining a plurality of routes for transferring each packet from a source node to a destination node. Each network interface further includes a path status table of path status indicators, e.g., bits, for indicating whether each route in the route tables is usable or is unusable as being associated with a fault. The network manager monitors the network to identify faults and provides the path status indicators to the respective network interfaces. Failed routes in the network are avoided based on the path status indicators. When a failed route is restored, such that the route is usable again, the path status table indicates that the usable state is restored. A balance of route usage in the network is maintained, without modifying routes or establishing different routes, enabling reliable and high-performance message transfer.

26 Claims, 7 Drawing Sheets

U.S. PATENT DOCUMENTS

| | | | |
|---|---|---|---|
| 6,560,218 B2 | 5/2003 | McAllister et al. | 370/351 |
| 6,570,867 B1 * | 5/2003 | Robinson et al. | 370/351 |
| 6,584,075 B1 | 6/2003 | Gupta et al. | 370/256 |
| 6,603,742 B1 * | 8/2003 | Steele et al. | 370/254 |
| 6,628,643 B1 * | 9/2003 | Park et al. | 370/351 |
| 6,643,256 B1 * | 11/2003 | Shimojo et al. | 370/229 |
| 6,683,885 B1 * | 1/2004 | Sugai et al. | 370/423 |
| 6,700,874 B1 * | 3/2004 | Takihiro et al. | 370/248 |
| 6,735,205 B1 * | 5/2004 | Mankude et al. | 370/395.32 |
| 6,757,242 B1 | 6/2004 | Wang et al. | 370/216 |
| 6,785,277 B1 | 8/2004 | Sundling et al. | 370/392 |
| 7,002,963 B1 * | 2/2006 | Buyukkoc et al. | 370/395.1 |
| 7,016,299 B2 * | 3/2006 | Kashyap | 370/218 |
| 7,039,922 B1 | 5/2006 | Shah et al. | 719/326 |
| 7,218,605 B2 * | 5/2007 | Ochiai et al. | 370/216 |
| 7,415,532 B2 * | 8/2008 | Shigeeda et al. | 709/238 |
| 7,644,137 B2 * | 1/2010 | Bozak et al. | 709/219 |
| 2003/0048771 A1 | 3/2003 | Shipman | 370/351 |
| 2003/0095509 A1 * | 5/2003 | Ramanan et al. | 370/256 |
| 2003/0142627 A1 | 7/2003 | Chiu et al. | 370/238 |
| 2003/0177228 A1 * | 9/2003 | Vigouroux et al. | 709/224 |
| 2004/0151130 A1 | 8/2004 | Beshai et al. | 370/254 |
| 2004/0153572 A1 | 8/2004 | Walker et al. | 709/239 |
| 2005/0100035 A1 * | 5/2005 | Chiou et al. | 370/412 |
| 2005/0188126 A1 * | 8/2005 | Mashima et al. | 710/36 |

FOREIGN PATENT DOCUMENTS

| | | |
|---|---|---|
| JP | 11-068749 | 3/1999 |
| JP | 2003-046545 | 2/2003 |
| KR | 2003057919 A | 7/2003 |

* cited by examiner

RELIABLE MESSAGE TRANSFER OVER AN UNRELIABLE NETWORK

TECHNICAL FIELD

This invention relates in general to network communications and, more particularly, to reliable communication of messages among nodes in an unreliable network, i.e., a network that does not guarantee delivery of messages.

BACKGROUND OF THE INVENTION

In a networked cluster, the network clients, or nodes, communicate over paths established between pairs of nodes. In such an environment, a message may be lost when a fault is encountered in the path of the message. A reliable network has the capability to take appropriate action to guarantee delivery. However, when a network does not have the capability to guarantee delivery or detect delivery failure, then the network is unreliable.

When links fail in a network, and network interfaces continue to send message packets over these failed links, the applications running on the hosts will experience packet drops. For example, if there are four routes available between a source-destination node-pair, and one of them has a faulty link, then the applications will see a twenty-five percent packet loss. If such packets are part of a relatively large message, then the probability of the entire message being successfully received decreases to nearly zero. A traditional solution for this problem is to replace a failing route with a good route. Using this approach, the original route needs to be replaced when the failed link becomes operational again. Otherwise, over time, the static balance of routes in the network will suffer degradation.

In an unreliable network, clients are typically required to retransmit messages until they are delivered successfully. This direct approach, i.e., of retransmitting lost messages, is generally not acceptable in high performance environments. For example, one such environment is a clustered supercomputer in which a number of servers are connected together using a high-speed network. These servers rely on fast, reliable message transfer for application efficiency.

Accordingly, there is a need to overcome the aforementioned drawbacks of an unreliable network in order to enable reliable, fast delivery of messages in a networked cluster.

SUMMARY OF THE INVENTION

The shortcomings of the prior art are overcome and additional advantages are provided through a technique for providing reliable delivery of messages over an unreliable network.

In accordance with exemplary embodiments of the present invention, a communications network comprises a plurality of nodes adapted to communicate by transmitting packets between source nodes and destination nodes. A network interface is associated with each node. Each network interface defines a plurality of routes for transferring each packet from a source node to a destination node. Each network interface further comprises path status indicators for indicating whether each route in the route tables is usable or is unusable as being associated with a fault. A network manager monitors the network to identify faults therein and provides the path status indicators to the respective network interfaces.

A method for communicating among the plurality of nodes in the network comprises: defining a plurality of routes for transferring a packet from a source node to a destination node; monitoring the network to identify faults therein; providing path status indicators for indicating whether each route is usable or is unusable as being associated with a fault; and selecting a usable route for transferring the packet from the respective source node to the respective destination node.

Failed routes in the network are avoided based on the path status indicators. When a failed route is restored, such that the route is usable again, the path status table indicates that the usable state is restored. Advantageously, therefore, unusable routes are avoided and a balance of route usage in the network is maintained, without modifying routes or establishing different routes, thereby enabling reliable and high-performance message transfer.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Presented herein is a technique for overcoming the drawbacks of an unreliable network in order to provide reliable delivery of messages therein.

Figure 1:
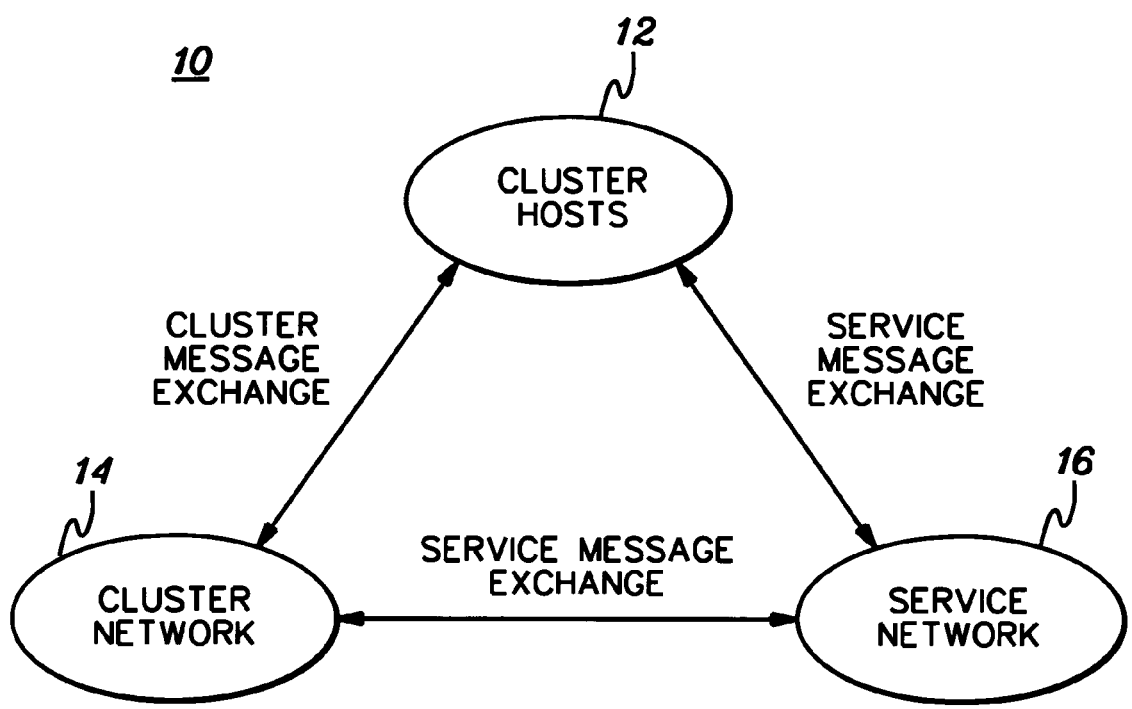
FIG. 1 depicts a simplified model of a cluster network of a type managed by a service network in accordance with an aspect of the present invention.

FIG. 1 illustrates a simplified model of a cluster system 10 comprising a plurality of servers, or cluster hosts 12, connected together using a cluster network 14 managed by a service network 16, e.g., such as in a clustered supercomputer system. As illustrated, messages are exchanged among all entities therein, i.e., cluster messages between cluster hosts 12 and cluster network 14; service messages between cluster hosts 12 and service network 16; and service messages between service network 16 and cluster network 14. To achieve high performance, such networks and servers rely on fast, reliable message transfers to process applications as efficiently as possible. Advantageously, in accordance with preferred embodiments of the present invention, a mechanism is provided to enable reliable and fast delivery of messages over an unreliable network.

Figure 2:
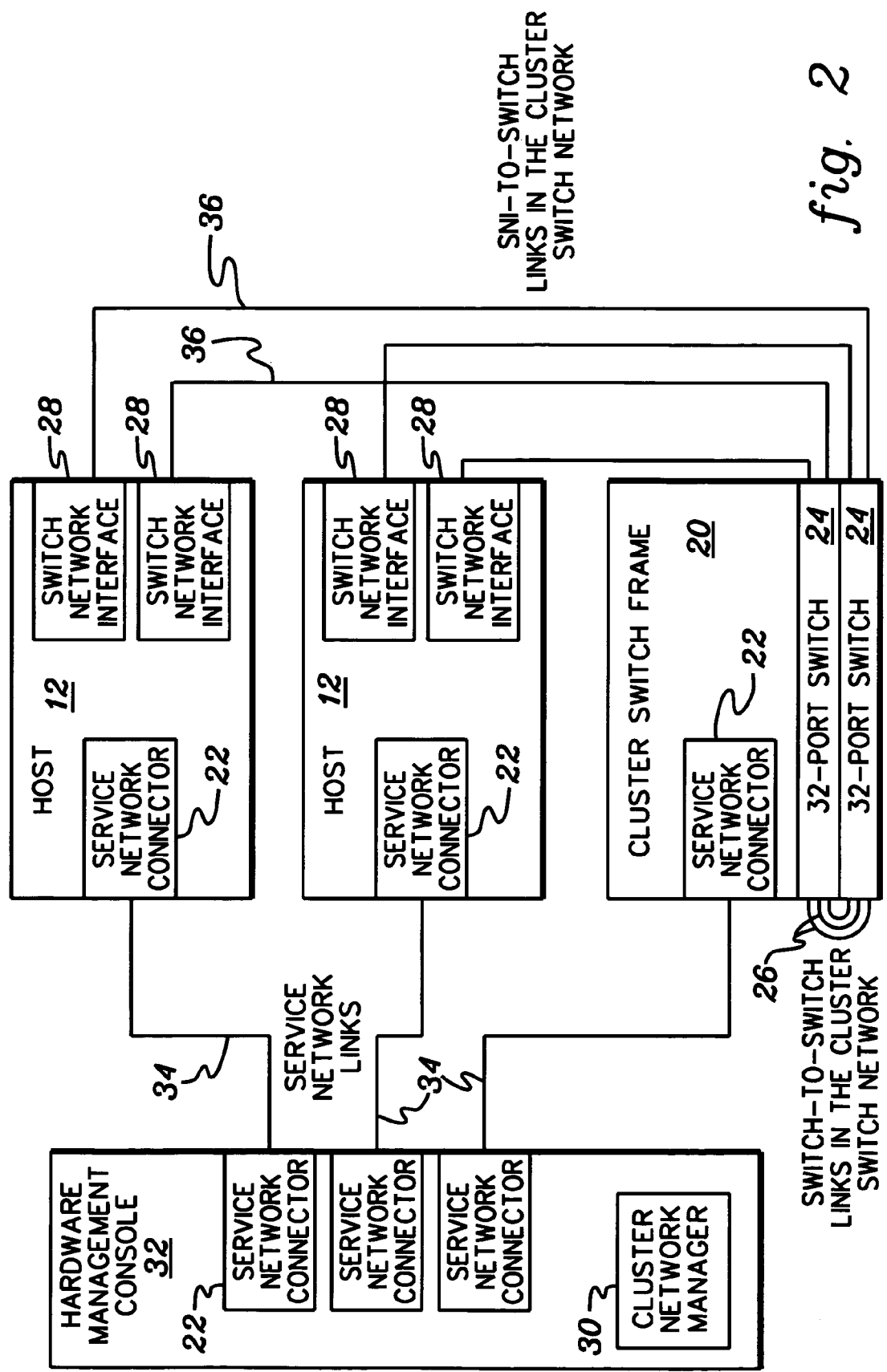
FIG. 2 schematically illustrates components of an exemplary cluster system in accordance with an aspect of the present invention.

FIG. 2 schematically illustrates an exemplary embodiment of a cluster system in accordance with the present invention. The cluster system comprises a plurality of hosts 12, also referred to herein as clients or nodes, interconnected by a plurality of switches, or switching elements, 24 of the cluster network 14 (see FIG. 1). Cluster switch frame 20 houses a service network connector 22 and the plurality of switching elements 24, illustrated in FIG. 2 as two switching elements by way of example only. Switching elements 24 are connected by links 26 in the cluster switch network such that there is more than one way to move a packet from one host to another, i.e., a source node to a destination node. That is, there is more than one path available between most host pairs.

Packets are injected into and retrieved from the cluster network using switch network interfaces 28, or specially designed adapters, between the hosts and the cluster network. Each switch network interface 28 comprises a plurality, and preferably three or more, route tables. Each route table is indexed by a destination identifier. In particular, each entry in the route table defines a unique route that will move an incoming packet to the destination defined by its index. The routes typically span one or more switching elements and two or more links in the cluster network. The format of the route table is determined by the network architecture. In an exemplary embodiment, four predetermined routes are selected from among the plurality of routes available between a source and destination node-pair. A set of routes thus determined between a source and all other destinations in the network are placed on the source in the form of route tables. During cluster operation, when a source node needs to send a packet to a specific destination node, one of the (e.g., four) routes from the route table is selected as the path for sending the packet.

In an exemplary embodiment, as illustrated in FIG. 2, the cluster network is managed by a cluster network manager 30 running on a network controller, referenced in FIG. 2 as the management console 32. In particular, in the illustrated embodiment, the management console is shown as comprising hardware, by way of example, and has a plurality of service network connectors 22 coupled over service network links 34 to service network connectors 22 in the hosts and cluster switch frames. The switch network interfaces (SNI) 28 in the hosts are connected to the switching elements 24 in the cluster switch frame 20 via SNI-to-switch links 36. In an exemplary embodiment, cluster network manager 30 comprises software. The network controller is part of a separate service network 16 (see FIG. 1) that manages, or administers, the cluster network. The network manager is responsible for initializing and monitoring the network. In particular, the network manager calls out repair actions in addition to computing and delivering the route tables to the cluster network hosts. Although certain aspects of this invention are illustrated herein as comprising software or hardware, for example, it will be understood by those skilled in the art that other implementations may comprise hardware, software, firmware, or any combination thereof.

Figure 3:
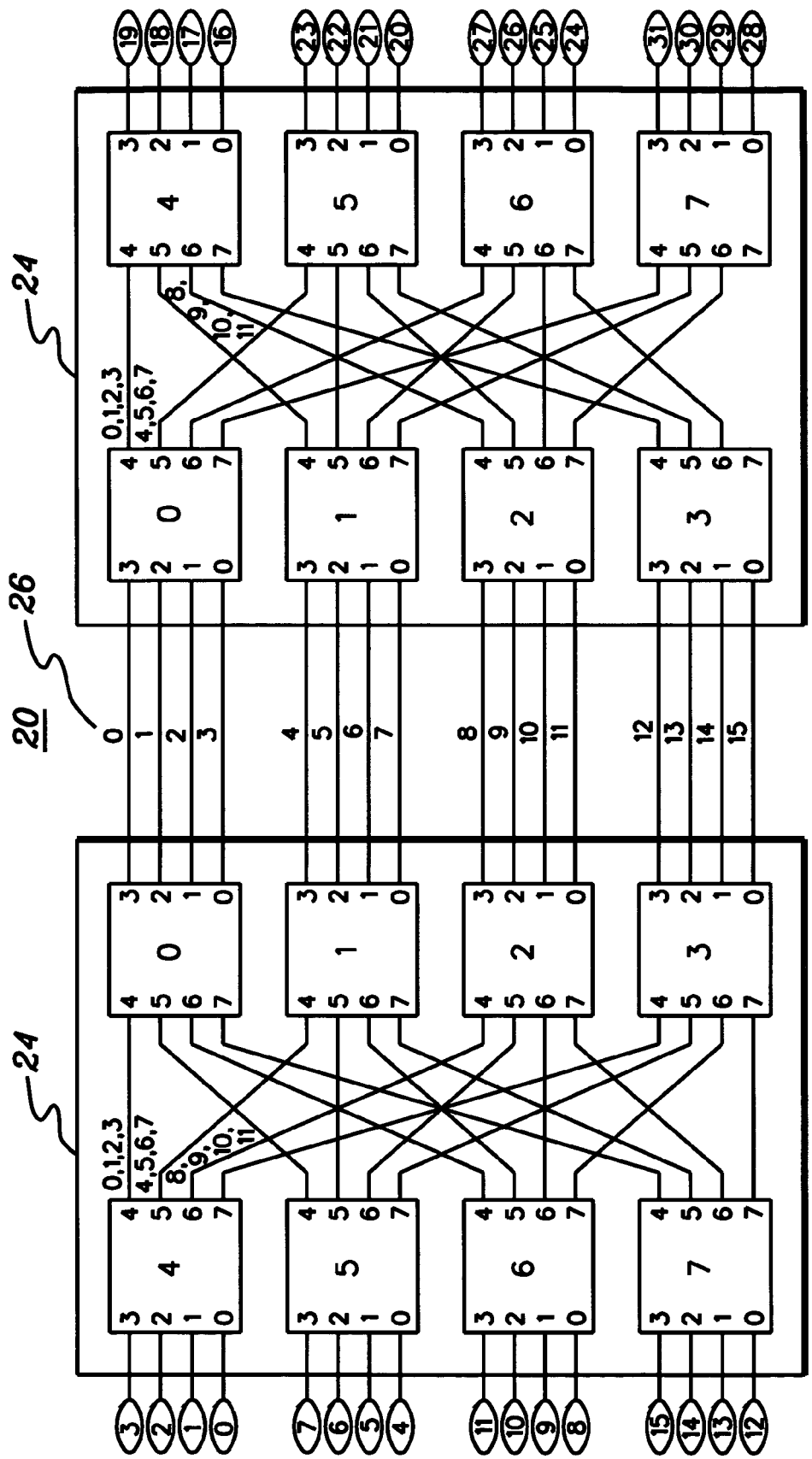
FIG. 3 schematically illustrates an exemplary cluster switch network useful in a cluster system, such as that of FIG. 2, in accordance with an aspect of the present invention.

FIG. 3 illustrates an exemplary cluster switch network, housed in frame 20, in more detail. The exemplary embodiment of FIG. 3 shows thirty-two hosts by way of example and illustration only, as will be understood by those skilled in the art. FIG. 3 illustrates that there is more than one path available between most host pairs. In particular, FIG. 3 illustrates a typical cluster network constructed using two thirty-two-port switches to provide connectivity between the thirty-two hosts. As shown, there are six paths between any one of the hosts numbered 0 to 3 to anyone of hosts 16 to 19. Each 32-port switch is constructed of eight switching elements labeled 0 through 7.

In accordance with preferred embodiments of the present invention, the network manager identifies faults in the network in order to determine which of the routes, if any, on any of the hosts are affected by a failure within the network. In an exemplary embodiment, the switch network interface 28 (see FIGS. 1 and 3) provides for setting of preferred bits in a path table to indicate whether a particular static route to a specific destination is preferred or not. In an exemplary embodiment, the path table comprises hardware; and faulty paths in a network are avoided by turning off the preferred bits associated with the respective faulty routes. When the switch network interface on a source node, or host, receives a packet to be sent to a destination, it will select one of the routes that has its preferred bits turned on. Thus, by toggling a preferred bit from a preferred to not-preferred state when a route corresponding to the bit is unusable due to a link failure on the route, then an alternative one of the routes in the route table will be used. The need for modification of the route for the particular message is thus advantageously avoided. When the failed link is restored, the route is usable again, and the path table preferred bit is toggled back again to its preferred state. Advantageously, the balance of routes employed is restored when all link faults are repaired, without the need for modifying the route or establishing a different route. Balancing usage of message routes in this manner thus provides a more favorable distribution, i.e., preferably an even distribution, of message traffic in the network. This effect of maintaining the relative balance of route usage may be more pronounced in relatively large networks, i.e., those having an even greater potential of losing links.

Another advantage of the technique for providing reliable message transfer in accordance with preferred embodiments of the present invention is that the global knowledge of the network status is maintained by the network manager 30 (see FIG. 2). That is, the network manager detects failed components, determines which paths are affected between all source-destination node-pairs, and turns off the path status bits in the appropriate route tables. In this way, attempts at packet transmissions over faulty paths are avoided.

Yet another advantage of the present invention is that all paths that fail due to a link failure are marked unusable by the network manager by turning their path status bits off. While prior methods rely on message delivery failure to detect a failed path, the present invention has the capability to detect and avoid failures before they occur.

Still a further advantage of the present invention is that when a failed path becomes usable again, the network manager merely turns the appropriate path status bits back on. This is opposed to prior methods that require testing the path before path usage is reinstated. Such testing by attempting message transmission is not needed in accordance with the present invention.

Figure 4:
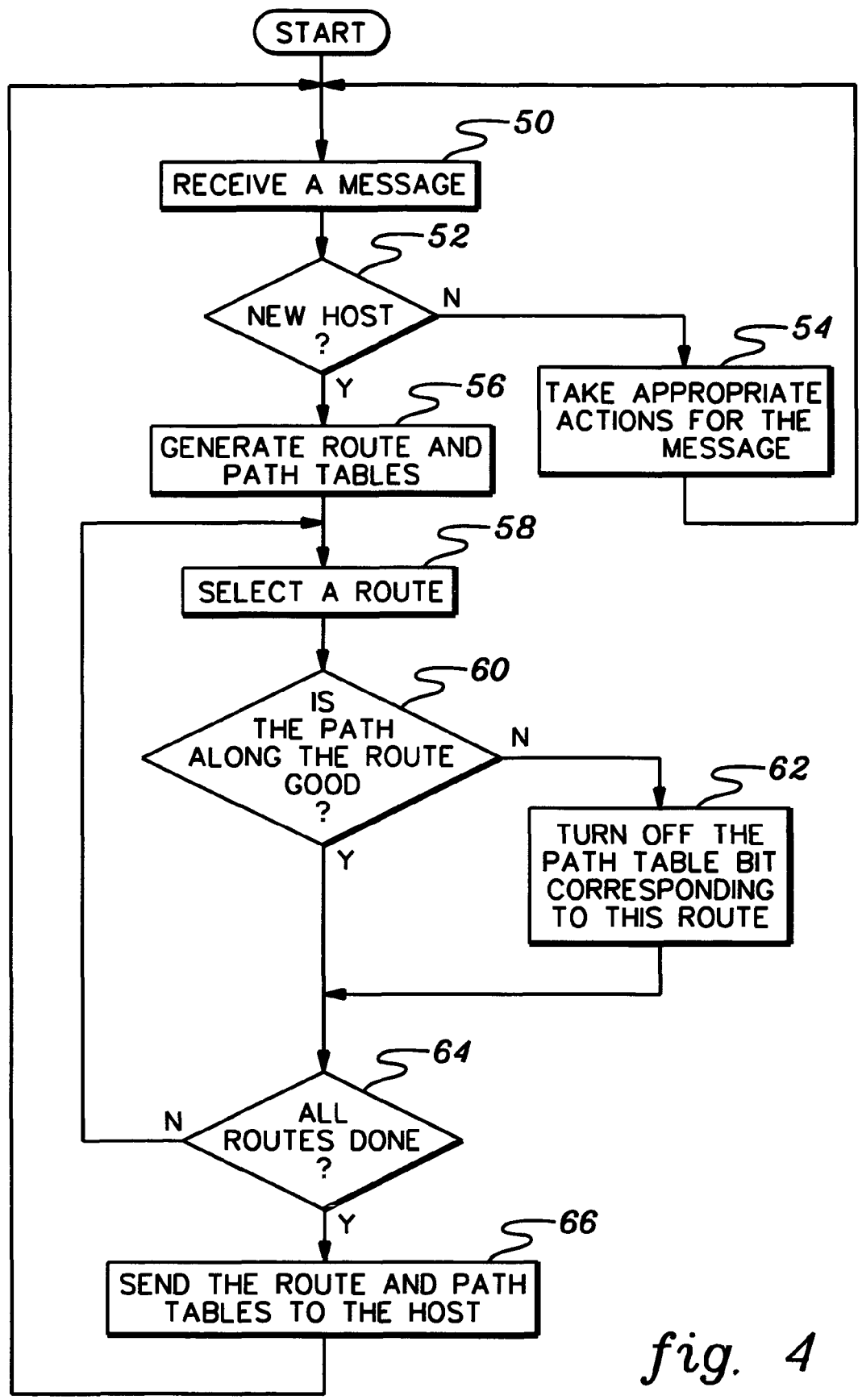
FIG. 4 is a flow chart depicting exemplary initial generation of a path table in accordance with an aspect of the present invention.

FIG. 4 is a flow chart illustrating initial generation of the path table, or preferred bit settings, in accordance with an exemplary embodiment of the present invention. First, an incoming service message is received by the cluster network manager in step 50. Then a query is made in step 52 as to whether the message pertains to a new host. If not, then as indicated in block 54, then appropriate actions for the message are taken. If the host is new, then in step 56 route and path tables are generated. A route is then selected in step 58. For example, the routes are selected sequentially from the route tables starting with the first one. After the route is selected, a query is made in step 60 as to whether the path along the route is good, i.e., whether the destination is reachable via the generated route, based on the status of the switch links in the network. If not, then the path table bit corresponding to this faulty route is turned off in step 62. If the route is good, then another query is made as to whether all routes have been queried as to faulty or good status in step 64. If so, then the route and path tables are sent to the host per step 66. The process repeats starting with step 50 when another message is received.

Figure 5:
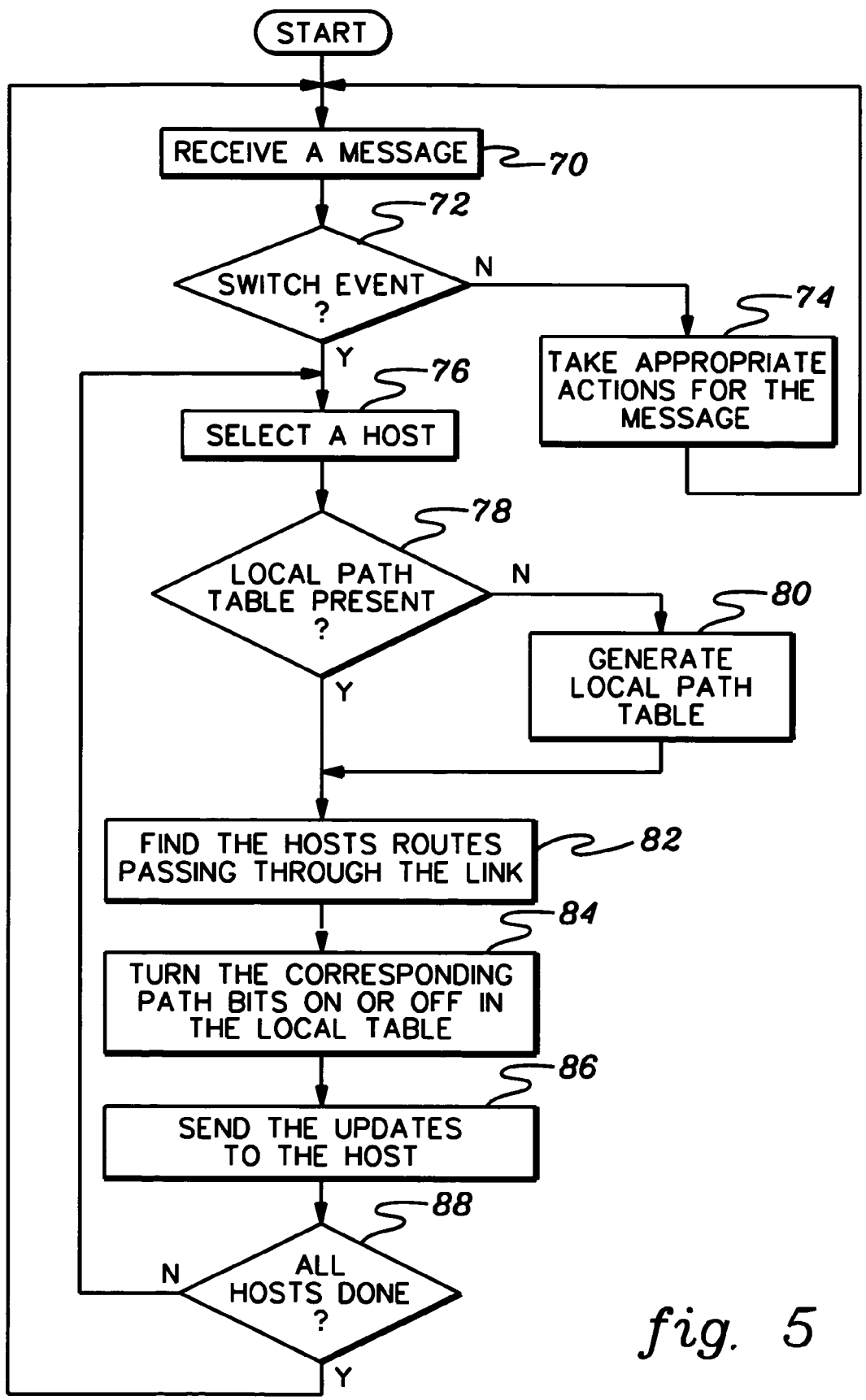
FIG. 5 is a flow chart depicting exemplary updating of a path table in accordance with an aspect of the present invention.

FIG. 5 is a flow chart illustrating update of a path table (i.e., preferred bit settings) in accordance with exemplary embodiments of the present invention. During operation of the cluster, the network may experience link outages or link recovery; and routes are accordingly removed or reinstated. In particular, whenever a link status change is identified, the path table is updated. As illustrated, an incoming message on the service network is received by the cluster network manager in step 70. Then a query is made in step 72 as to whether this is a switch event, i.e., whether a link status change is identified, indicating that routes may have failed or restored. If not, as indicated in step 74, appropriate actions are taken as determined by the network manager. If it is a switch event indicating a link status change, however, then a host is selected in step 76. After the host is selected, a query is made in step 78 as to whether there is a local path table present for the host. If not, then the local path table is generated in step 80. If there is a local path table present, or after it is generated, then in step 82, the host's route passing through the link is determined. Next, in step 84, the corresponding path in the local table is turned on or off. In step 86, updates are sent to the host. A query is then made in step 88 as to whether all hosts have been processed. If not, the process returns to step 76; and when all hosts have been queried, the process repeats with receipt of a message in step 70.

Figure 6:
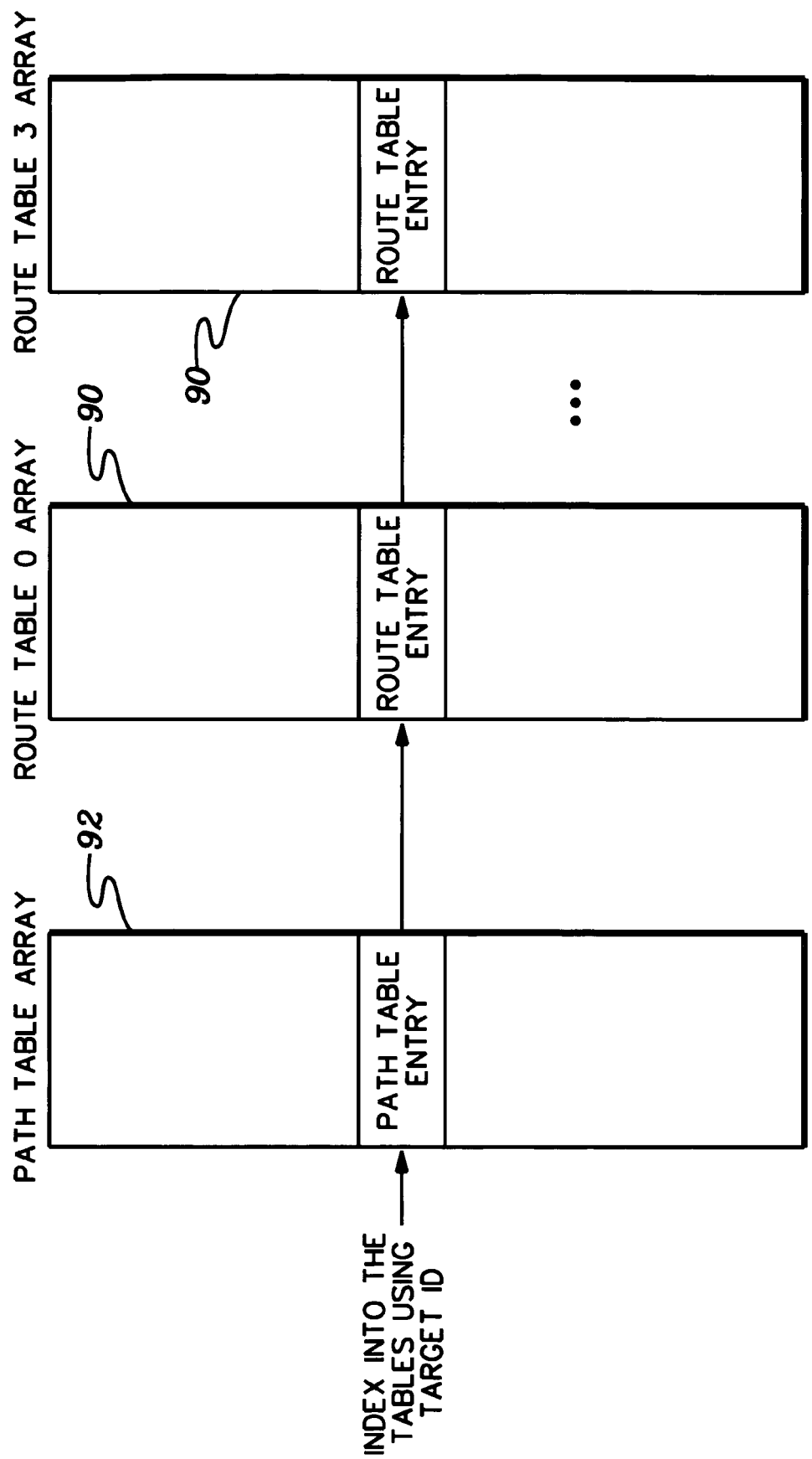
FIG. 6 depicts exemplary route and path table structures on a switch network interface in accordance with an aspect of the present invention.

FIG. 6 illustrates exemplary route and path table structure for an embodiment of a switch network interface 28 (see FIG. 2). Each switch network interface comprises a plurality, i.e., preferably three or more, route tables 90. Each entry in the route table defines a unique route for moving an incoming packet to its destination as specified by an index. In exemplary embodiments, each route spans one or more switching elements and two or more links in the cluster network. The format of the route table depends on the network architecture. A predetermined number of paths (e.g., four) are chosen from among the plurality of paths available between a source-destination node-pair to define the routes between the pair. A set of routes is thus defined between a source and all other destinations in the network; this set of routes is placed on the source in the form of route tables 90. Path tables 92 contain preferred bit settings to indicate which routes in the route tables are usable.

Figure 7:
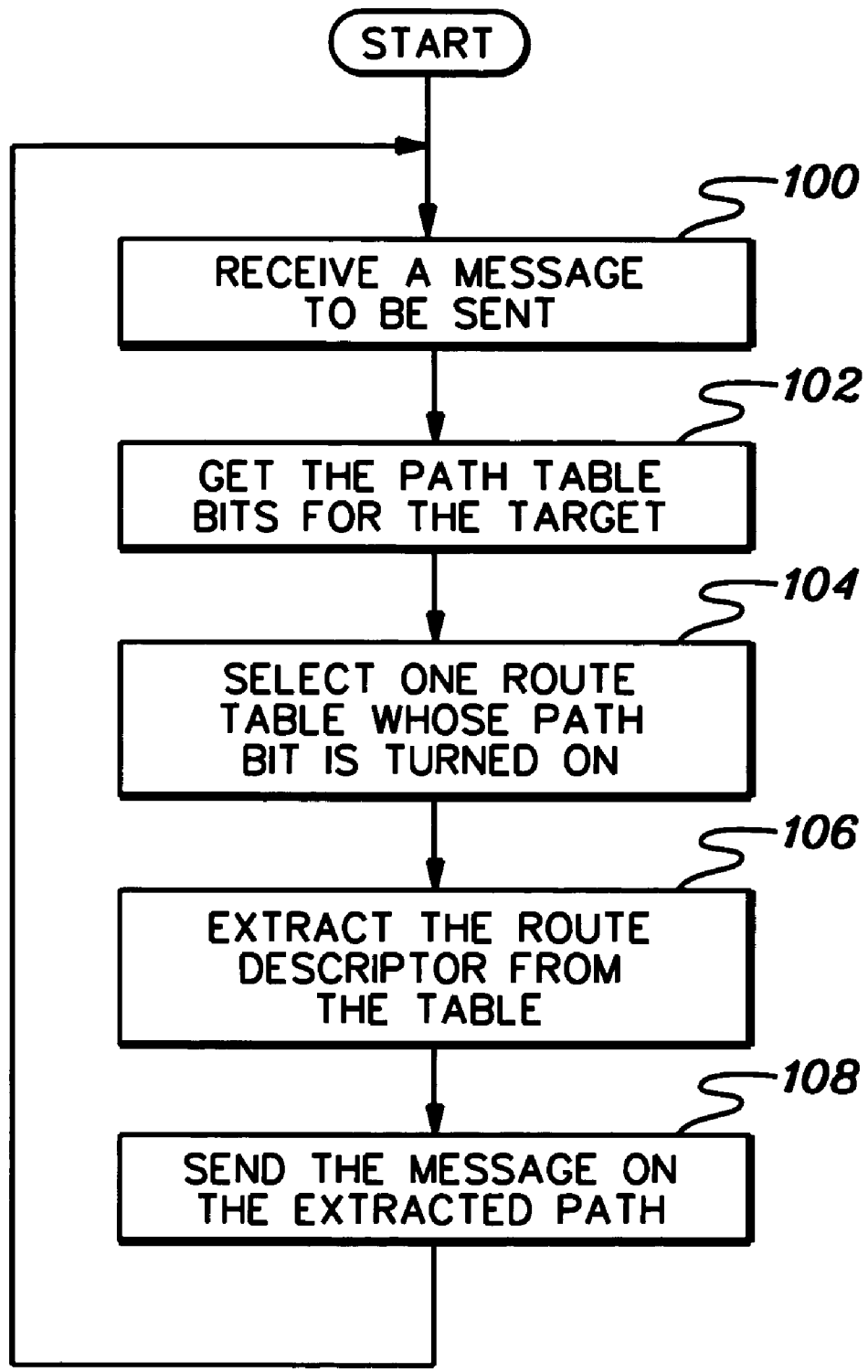
FIG. 7 is a flow chart depicting exemplary path selection logic in a switch network interface in accordance with an aspect of the present invention.

FIG. 7 is a flow chart illustrating exemplary path selection logic in the switch network interface 28 (see FIG. 2). A message is received from the host in step 100. Then in step 102, the path table bits are retrieved from the corresponding path table entry for the target destination. In step 104, a route is selected for which the preferred path bit is turned on. The route descriptor is extracted from the route table in step 106. The message is then sent in step 108 on the route extracted from the table.

Advantageously, therefore, in accordance with preferred embodiments of the present invention, preferred bits in the path table are dynamically modified, such that only good routes are utilized for transmitting messages, while faulty routes are avoided. As a result, reliable message transfer is achieved over an unreliable network.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for communicating among a plurality of nodes in a network, comprising:
   providing, by a network manager to a source node, at least one route data structure comprising a plurality of unique routes defined for transferring a packet from the source node to a destination node in the network, wherein a unique route comprises at least one switching element and at least two links, the at least one switching element being disposed between the at least two links along the unique route, the at least one route data structure comprising a plurality of entries, wherein an entry is associated with a respective route of the plurality of unique routes;
   monitoring, by the network manager, the network to identify faults therein; and
   providing, by the network manager, path status indicators to the source node, wherein a path status indicator corresponds to a unique route of the defined plurality of unique routes and comprises a preferred indicator that toggles between preferred and non-preferred status to indicate to the source node whether the unique route as defined in its associated entry is usable or unusable and to facilitate selecting by the source node a usable route for transferring the packet from the source node to the destination node.

2. The method of claim 1, wherein the at least one route data structure comprises one or more route tables for the plurality of unique routes, wherein a route table comprises a plurality of entries such that each entry is associated with a respective route between a source node and a destination node.

3. The method of claim 2, further comprising providing a destination identifier for indexing the entries in the one or more route tables.

4. The method of claim 2, comprising providing at least three route tables corresponding to each source node and destination node pair.

5. The method of claim 1, further comprising providing a path status table for the path status indicators, the path status table being separate from the at least one route data structure.

6. The method of claim 1, further comprising determining repair actions for routes associated with identified faults.

7. A communications network, comprising:
a source node adapted to communicate with a destination node by transmitting packets from the source node to the destination node;
a network interface associated with the source node, the network interface comprising at least one route data structure provided by a network manager coupled to the source node, the at least one route data structure comprising a plurality of unique routes defined for transferring a packet from the source node to the destination node, wherein a unique route comprises at least one switching element and at least two links, the at least one switching element being disposed between the at least two links along the unique route, and the at least one route data structure comprising at plurality of entries, wherein an entry is associated with a respective route of the defined plurality of unique routes; and
the network interface further comprising path status indicators provided by the network manager, wherein a path status indicator corresponds to a unique route of the defined plurality of unique routes and comprises a preferred indicator that toggles between preferred and non-preferred status to indicate to the source node whether the unique route as defined in its associated entry is usable or unusable and to facilitate selecting by the source node a usable route for transferring the packet from the source node to the destination node.

8. The communications network of claim 7, wherein the provided at least one route data structure comprises a plurality of route tables for defining the plurality of unique routes.

9. The communications network of claim 8, wherein each route table comprises a plurality of entries indexed by a destination identifier, each entry being associated with a respective route between a source node and a destination node.

10. The communications network of claim 8, comprising at least three route tables corresponding to each source node and destination node pair.

11. The communications network of claim 8, wherein the network manager determines the route tables and provides the route tables to the network interface.

12. The communications network of claim 7, further comprising a path status table comprising the path status indicators, the path status table being separate from the at least one route data structure.

13. The communications network of claim 7, wherein the network manager monitors for faults and determines repair actions for routes associated with identified faults.

14. A computer program product for facilitating communication among a plurality of nodes in a network, the computer program product comprising:
a non-transitory storage medium readable by a processor and storing instructions for execution by the processor for performing a method comprising:
providing, by a network manager to a source node, at least one route data structure comprising a plurality of unique routes defined for transferring a packet from the source node to a destination node in the network, wherein a unique route comprises at least one switching element and at least two links, the at least one switching element being disposed between the at least two links along the unique route, the at least one route data structure comprising a plurality of entries, wherein an entry is associated with a respective route of the plurality of unique routes;
monitoring, by the network manager, the network to identify faults therein; and
providing, by the network manager, path status indicators to the source node, wherein a path status indicator corresponds to a unique route of the defined plurality of unique routes and comprises a preferred indicator that toggles between preferred and non-preferred status to indicate to the source node whether the unique route as defined in its associated entry is usable or unusable and to facilitate selecting by the source node a usable route for transferring the packet from the source node to the destination node.

15. The computer program product of claim 14, wherein the provided at least one route data structure comprises one or more route tables for the plurality of unique routes, wherein a route table comprises a plurality of entries such that each entry is associated with a respective route between a source node and a destination node.

16. The computer program product of claim 15, wherein the method further comprises providing a destination identifier for indexing the entries in the one or more route tables.

17. The computer program product of claim 15, wherein the method further comprises providing at least three route tables corresponding to each source node and destination node pair.

18. The computer program product of claim 14, wherein the method further comprises providing a path status table for the path status indicators, the path status table being separate from the at least one route data structure.

19. The computer program product of claim 14, wherein the method further comprises determining repair actions for routes associated with identified faults.

20. A computer system for facilitating communication among a plurality of nodes in a network, the computer system comprising:
a memory; and
a processor, in communications with the memory, wherein the computer system is configured to perform a method, said method comprising:
providing to a source node at least one route data structure comprising a plurality of unique routes defined for transferring the packet from the source node to a destination node in the network, wherein a unique route comprises at least one switching element and at least two links, the at least one switching element being disposed between the at least two links along the unique route, the at least one route data structure comprising a plurality of entries, wherein an entry is associated with a respective route of the plurality of unique routes;
monitoring the network to identify faults therein; and
providing path status indicators to the source node, wherein a path status indicator corresponds to a unique route of the defined plurality of unique routes and comprises a preferred indicator that toggles between preferred and non-preferred status to indicate to the source node whether the unique route as defined in its associated entry is usable or unusable and to facilitate selecting by the source node a usable route for transferring the packet from the source node to the destination node.

21. The computer system of claim 20, wherein the provided at least one route data structure comprises one or more route tables for the plurality of unique routes, wherein a route table comprises a plurality of entries such that each entry is associated with a respective route between a source node and a destination node.

22. The computer system of claim 21, wherein the method further comprises providing a destination identifier for indexing the entries in the one or more route tables.

23. The computer system of claim 21, wherein the method further comprises providing at least three route tables corresponding to each source node and destination node pair.

24. The computer system of claim 20, wherein the method further comprises providing a path status table for the path status indicators, the path status table being separate from the at least one route data structure.

25. The computer system of claim 20, wherein the method further comprises determining repair actions for routes associated with identified faults.

26. The method of claim 1, further comprising selecting, by the source node, the unique route of the defined plurality of unique routes to be used to transfer the packet, the selecting being based on the preferred indicator of the unique route indicating the unique route as being usable.

* * * * *